United States Patent [19]
Potter et al.

[11] Patent Number: 5,157,657
[45] Date of Patent: Oct. 20, 1992

[54] COMMUNICATIONS METHOD FOR A SHARED-MEDIUM COMMUNICATIONS METHOD

[75] Inventors: Philip G. Potter, Blackburn South; Moshe Zukerman, Mount Waverly, both of Australia

[73] Assignee: Australian Telecommunications Corporation, Melbourne, Australia

[21] Appl. No.: 825,305

[22] Filed: Jan. 22, 1992

Related U.S. Application Data

[63] Continuation of Ser. No. 446,755, Dec. 6, 1989, abandoned.

[30] Foreign Application Priority Data

Dec. 7, 1988 [AU] Australia ................. PJ1841
Sep. 13, 1989 [AU] Australia ................. PJ6327

[51] Int. Cl.⁵ .................. H04J 3/24; H04J 3/02
[52] U.S. Cl. ...................... 370/85; 370/85.1; 370/85.11; 370/94.1; 340/825.5
[58] Field of Search ............. 370/85.1, 85.2, 85.6, 370/85.7, 85.9, 85.11, 94.1, 95.1, 95.3; 360/825.5, 825.51

[56] References Cited

U.S. PATENT DOCUMENTS

| | | | |
|---|---|---|---|
| 3,796,992 | 3/1974 | Nakamura et al. | 370/85.6 |
| 4,500,987 | 2/1985 | Hasegawa | 370/94.1 |
| 4,532,626 | 7/1985 | Flores et al. | 370/85.9 |
| 4,581,734 | 4/1986 | Olson et al. | 370/85.6 |
| 4,593,282 | 6/1986 | Acampora et al. | 370/85.6 |
| 4,819,229 | 4/1989 | Pritty et al. | 370/85.6 |
| 4,922,244 | 5/1990 | Hullett et al. | 370/94.1 |
| 4,977,557 | 12/1990 | Phung et al. | 370/85.6 |
| 5,001,707 | 3/1991 | Kositpaiboon et al. | 370/94.1 |

FOREIGN PATENT DOCUMENTS

| | | | |
|---|---|---|---|
| 0048148 | 3/1987 | Japan | 370/85.6 |
| 0193631 | 8/1988 | Japan | 370/85.6 |

OTHER PUBLICATIONS

IEEE 802.6, Proposed Standard: DQDB Metropolitan Area Network, pp. 23-35.

Primary Examiner—Douglas W. Olms
Assistant Examiner—Alpus H. Hsu
Attorney, Agent, or Firm—Fish & Richardson

[57] ABSTRACT

A communications method for a shared-medium communications network having a plurality of stations connected by a first and second bus. The first bus is for data transmission in one direction and the second bus is for data transmission in an opposite direction. The method includes transmitting data between stations in slots. A station desiring to transmit requests the use of a slot by placing a request signal on the bus in a direction opposite to the desired direction of transmission. A slot is then used on a first request, first use priority except for a least one station which is allocated a slot without regard to the first request first use priority. This allocation provides for guaranteed bandwidth traffic.

26 Claims, 5 Drawing Sheets

COMMUNICATIONS METHOD FOR A SHARED-MEDIUM COMMUNICATIONS METHOD

This is a continuation of copending application Ser. No. 07/446,755 filed on Dec. 6, 1989, now abandoned.

FIELD OF THE INVENTION

The present invention relates to a communications method for a shared-medium communications network. More specifically, but not exclusively, the method is a media access control technique and an improvement of the Distributed Queue Dual Bus (DQDB) protocol which was previously known as the Queued Packet and Synchronous Switch (QPSX) communications protocol for area networks.

BACKGROUND OF THE INVENTION

The DQDB protocol, described hereinafter and more fully in IEEE 802.6 Committee, "Draft of Proposed IEEE Standard 802.6 Distributed Queue Dual Bus (DQDB) Metropolitan Area Network (MAN)"—Drafts D0 to D10, is advantageous in a number of respects but it does not provide a technique by which a guaranteed capacity can be allocated to each station in a network, which is desirable if a station has to transmit delay sensitive services which require access to at least a specified number of packets per unit of time. Traffic requiring a guaranteed capacity, or bandwidth, can be either connection oriented (e.g. variable or fixed rate video requires low delay jitter) or connectionless (e.g. fast and reliable large file transfer). This type of traffic will hereinafter be referred to as guaranteed capacity traffic.

Therefore, an access protocol is required which is able to ensure guaranteed capacity and adequate performance, e.g. low delay for connection oriented services or for fast and reliable large file transfer.

SUMMARY OF THE INVENTION

In accordance with the present invention there is provided a communications method for a shared-medium communications network having a plurality of stations connected in series by first and second buses, the first bus being for data transmission in one direction and the second bus being for data transmission in an opposite direction, said method comprising:
  transmitting data between, to and from said stations on said buses in packets, or slots, of data;
  said stations requesting the use of a slot for data transmission by placing a request signal on the bus which transmits data in a direction opposite to the desired direction of transmission;
  satisfying requests for use of a slot by said stations on a first request, first use priority; and
  providing an allocation, for at least one of said stations, with respect to the number of request signals for guaranteed bandwidth traffic which a station can issue to obtain the use of slots without having regard to said first request, first use priority.

The term "first request, first use" used above is referred to in the queuing theory art as "first come first served".

Preferably said method further comprises establishing at least two priority levels on which requests can be made, whereby any one request signal corresponds to one of said priority levels, wherein request signals corresponding to a guaranteed priority level relate to requests made to obtain slots without regard to the first request, first use priority, and request signals corresponding to the remaining priority levels relate to requests which are satisfied according to a first request, first use priority with respect to the corresponding priority level, requests corresponding to a high priority level being satisfied before requests corresponding to a low priority level.

Preferably said allocation is renewed at the end of a cycle. Preferably said end occurs after a predetermined time or when the network enters an idle state whichever occurs first. Preferably said end cannot occur until a predetermined period of time has expired from the beginning of the cycle. Preferably said network enters an idle state when an available slot is issued by a head of bus and there are no requests, for the guaranteed priority level or higher, outstanding at the head of bus.

In accordance with the present invention there is also provided a station for a network which uses the communications method described above, comprising:
  a request count which represents the number of requests received via one of said buses, said request signals representing requests for use of slots on the basis of said first request, first use priority and said request count being decremented accordingly when an available slot is allowed by the station to pass on the other bus;
  a request outstanding count which represents the number of requests made by the station without regard to the first request, first use priority and which have not been satisfied; and
  a remaining request count which represents the number of requests which the station can make without regard to the first request, first use priority, said remaining request count being decremented when the station issues such a request.

Preferably said station is such that requests without regard to the first request, first use priority are satisfied as soon as an available slot is accessible to the station, unless a higher priority level request is outstanding.

The present invention also provides said shared-medium communication network having at least one of said stations, wherein the two buses are terminated by units which maintain counts of request signals received and issue available slots for data transmission, and the network enters an idle state when an available slot is issued on one of said buses and k consecutive slots, without request signals for the guaranteed priority level or higher, have been received by a terminating unit on the other bus, k being a positive integer.

BRIEF DESCRIPTION OF THE DRAWINGS

A preferred embodiment of the present invention will now be described, by way of example only, with reference to the accompanying drawings wherein.

DETAILED DESCRIPTION

Figure 1:
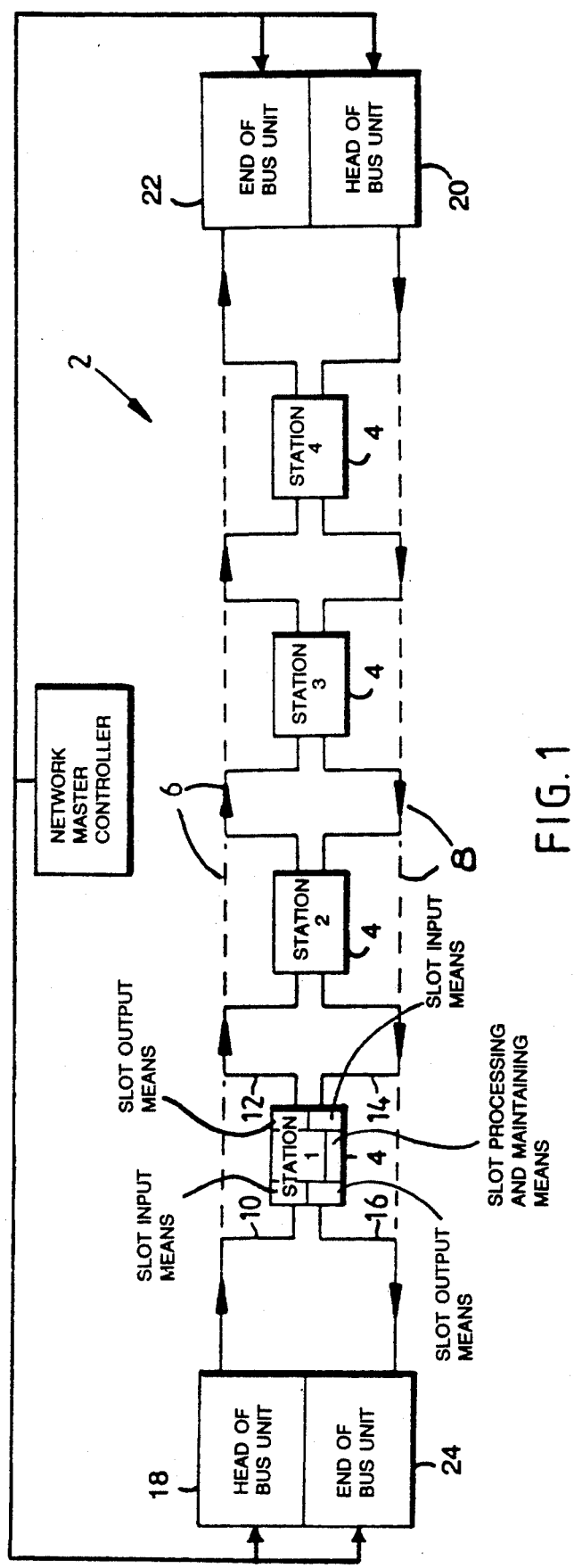
FIG. 1 is a block diagram of a network which is structured so that it is able to utilise the communications method of the present invention.

A shared-medium communications network 2, as shown in FIG. 1, includes a plurality of stations 4 which are connected in series by means of two parallel buses 6 and 8. The stations 4 each include an input 10 for accessing data on the first bus 6, an output 12 for placing data on the first bus 6, an input 14 for accessing data on the second bus 8, and an output 16 for placing data on the second bus 8. The stations 4 are fast packet switches and direct data to a terminal or terminals connected thereto. The terminals would in most instances be customer terminals, such as a telephone or a PABX. The stations 4 include standard high speed data processing hardware, such as counters, a microprocessor and associated memory, and an access unit for reading data from and writing data to the buses 6 and 8. Both buses 6 and 8 begin at respective Head of Bus (HOB) units 18 and 20 and terminate at respective End of Bus (EOB) units 22 and 24. The HOB units 18 and 20 and the EOB units 22 and 24 are each controlled by a master controller (not shown). Preferably the buses are serial data lines.

The shared-medium communications network structure illustrated in FIG. 1 is used to implement the QPSX protocol and is distinctly different from the token ring and slotted ring structures which are used to implement other protocols for metropolitan area networks. The following is a description of the QPSX protocol.

The HOB units 18 and 20 continuously generate frames of data which are placed on the buses 6 and 8 and transmitted by the buses 6 and 8 to the EOB units 22 and 24. The frames have a period of 125 microseconds and include, inter alia, a number of packets, or slots, for use in transmitting data between, from and to the stations 4. Typically a frame has about 60 slots. The number of slots in each frame depends on the bit rate of the buses 6 and 8. Each slot includes approximately 69 bytes and has a header of 5 bytes disposed at the leading end thereof. The headers of the slots include a busy bit which indicates whether the respective slot is full, i.e. includes data for transmission, or is empty, i.e. is available for use to transmit data. The headers of the slots also include four request bits which each correspond to a respective priority level.

Figure 2:
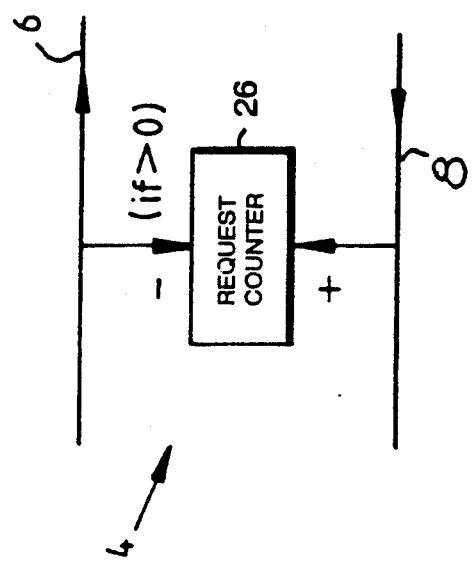
FIG. 2 is a schematic diagram illustrating how a station maintains a count of requests issued.

The stations 4 each include a request counter 26, as shown in FIG. 2, for each priority level and for each of the two buses 6 and 8. For four priority levels each station 4 includes eight request counters. The request counters 26 increment their contents by one whenever a slot passes the respective station 4 on the corresponding bus 6 or 8 and has a high request bit corresponding to the respective priority level. The contents of a request counter 26 is decremented by one, but never allowed to go negative, whenever a slot passes the station 4 on the opposite bus 8 or 6 and the busy bit of the slot is low indicating the slot is empty and available for use.

A request for use of a slot for transmission by a station 4 is made by setting a request bit of a slot which is traveling on the bus 6 or 8 in a direction opposite to the desired direction of transmission. Thus, a station 4 wishing to transmit on the first bus 6 sets a request bit of a slot on the second bus 8. The set request bit acts as a request signal which advises stations 4 further down the second bus 8 that another station 4 wishes to transmit on the first bus 6. The stations 4 further down the second bus 8 record the request by incrementing the appropriate request counter 26, as shown in FIG. 2, when the set request bit is received. The request counters 26 of the acknowledging stations 4 are decremented and the record of the request removed when a slot available for transmission, i.e. one having a low busy bit, passes the stations 4 on the first bus 6. Thus, the acknowledging stations 4 have recognised that the available slot will be used by the requesting station 4.

Figure 3:
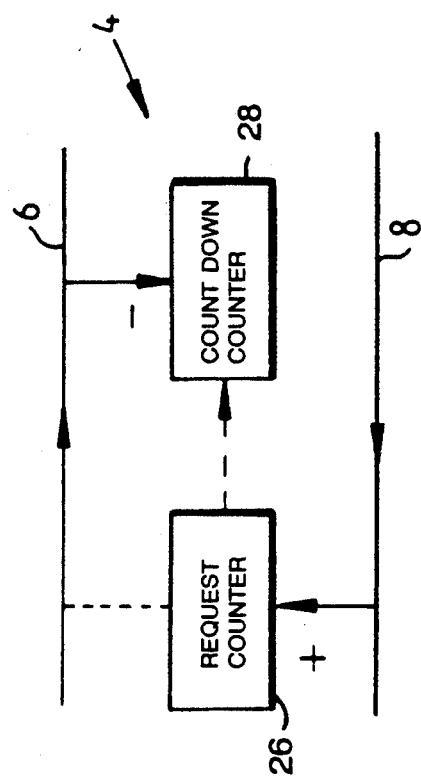
FIG. 3 is a schematic diagram which illustrates how a station gains access to an available slot.

The stations 4 further include countdown counters 28 for each request counter 26 disposed therein. Whenever a station 4, as shown in FIG. 3, issues a request for a slot the contents of the request counter 26, corresponding to the priority level of the request, of the station 4 is read into the corresponding countdown counter 28. The contents of the countdown counter 28 therefore provides an indication of the position of the station 4 in the distributed queue for available slots for the bus 6 or 8 on which the station 4 wishes to transmit. Countdown counters 28 are decremented by one whenever an available slot on the desired bus 6 or 8 passes the respective station 4 and when the contents of a countdown counter 28 at a given priority level is zero the respective station can then after referring to higher priorities within the same station, utilise an available slot which appears on the desired bus 6 or 8 for transmission at that given priority level. Corresponding request counters 26 continue to monitor requests which are transmitted on the opposite bus. FIG. 3 illustrates the case when a station 4 wishes to transmit on the first bus 6.

The stations 4 of the shared-medium communications network 2 monitor or access one slot at a time.

The priority levels are established by incrementing request counters 26 of a station 4 which correspond to the same priority level or a lesser priority level to that of a received request signal. If countdown counters corresponding to a lower or lesser priority level to that of the request are being utilised then these counters are incremented instead of their corresponding request counters. As there are four request bits provided in the slots of the frames generated by the HOB units 18 and 20, there are four priority levels, 3, 2, 1, 0, with 0 being the lowest and 3 being the highest. The highest priority level 3 would be used, for example, in a metropolitan area network for reserving capacity for signaling, control and fault configuration.

Figure 4:
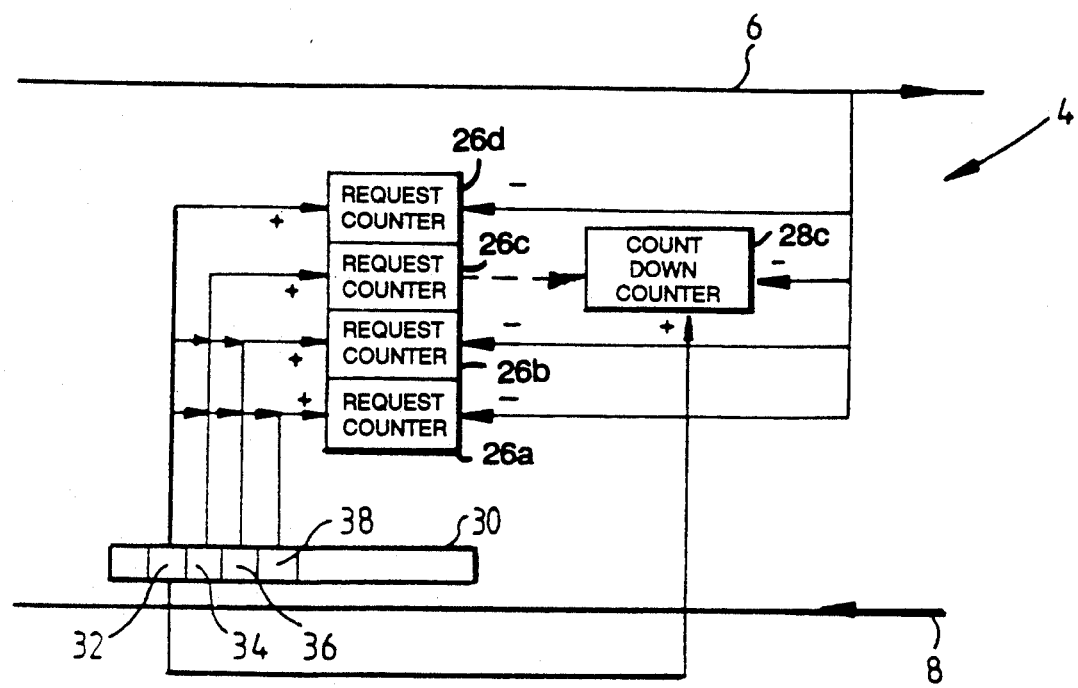
FIG. 4 is a schematic diagram which illustrates how priority levels are established for the communications method.

FIG. 4 illustrates the four request counters 26 of a station 4 which are used to monitor requests received on the second bus 8 for transmission on the first bus 6. Also illustrated is the countdown counter 28c for priority level 2. In the example illustrated in FIG. 4, the station 4 wishes to transmit on the first bus 6 and has issued a request at priority level 2. Whilst the station 4 is waiting for an available slot which it can utilise all available slots which pass the station 4 on the first bus 6 cause the contents of the priority level 3 request counter 26d, the priority level 2 countdown counter 28c, the priority level 1 request counter 26b and the priority level 0 request counter 26a to be decremented if positive, or otherwise left at zero. With the station 4 in the state illustrated in FIG. 4, if a slot 30 is present on the bus 8 and the priority level 3 request bit 32 is high then the priority level 2 countdown counter 28c is incremented, together with all of the request counters 26, except the priority level 2 request counter 26c. If, instead, the priority level 2 request bit 34 is set only the request counters 26 are incremented, except the priority level 3 request counter 26d. If the priority level 1 request bit 36 is set only the priority level 1 and priority level 0 request counters 26b and 26a are incremented and if the priority level 0 request bit 38 is set only the priority level 0 request counter 26a is incremented.

Distributed queues are established amongst the stations 4 of the shared-medium communications network 2 with respect to each priority level and requests at a high priority level, priority level 3 say, are satisfied before requests made at lower priority levels, e.g. priority level 2.

Although the DQDB protocol is an advantageous protocol, it does not enable a station 4 to provide guaranteed capacity for guaranteed capacity traffic. A preferred embodiment of the communications method of the present invention is adapted to attend to this problem and is described hereinafter.

Figure 5:
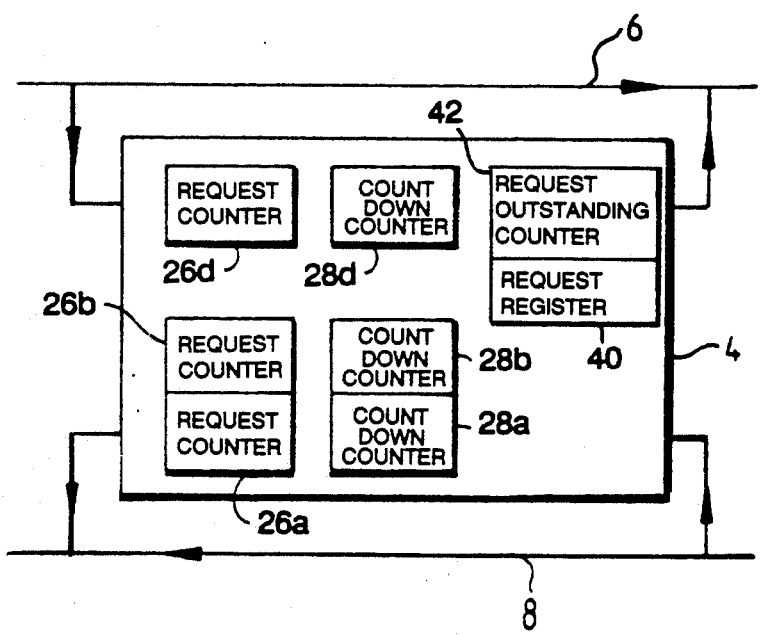
FIG. 5 is a block diagram of a station which is able to utilise the communications method of the present invention.

The method involves allocating each station a number of priority level 2 requests which can be made during a cycle. The allocation is initially placed in a remaining request counter 40 of each station 4, as shown in FIG. 5. Priority level 2 is used as the priority level for guaranteed capacity traffic and the priority level 2 request counters 26c and countdown counters 28c are removed or ignored for each of the stations 4. When a station 4 issues a request at priority level 2 a request outstanding counter 42 of the station 4 is incremented. That request is satisfied and the counter 42 decremented as soon as an available slot is accessible by the station 4, provided the priority level 3 request counter 26d is zero and the station 4 does not have priority 3 data to transmit i.e. all priority level 3 requests from the same and downstream stations have been satisfied. The request outstanding counter 42 is used to determine the number of outstanding requests which need to be satisfied for the respective station 4 at priority level 2. When a priority level 2 request has been issued for a station 4 the respective remaining request counter 40 is decremented by one. When the remaining requests counter for a station 4 reaches zero, the station 4 can no longer make any requests at priority level 2 before the end of a cycle.

A cycle is monitored with respect to each bus 6 and 8 and for the purposes of simplification the following description only relates to a cycle monitored with respect to the first bus 6 and it should be noted that the description also applies to the cycle monitored with respect to the second bus 8.

A cycle ends when a predetermined period of time, cycle-max, has expired or when the first bus 6 enters an idle state. Cycle-max may be set with respect to the number of slots issued by the HOB 18 or the number of slots received by the EOB 24. Detection of an idle state is achieved by monitoring a priority 2 request count at the HOB 18 for the first bus 6 and the EOB 24 for the second bus 8. The request count is incremented for each request at priority 2 or 3 received by the EOB 24 from bus 8 and is decremented when an empty or available slot is passed from the HOB 18 to the first bus 6. If the request count at the HOB 18 and EOB 24 remains zero while k consecutive slots are received by the EOB 24 from the second bus 8 then this indicates that all of the stations 4 in the local area network 2 have either exhausted their priority level 2 request allocation, or have no requests to send. When this occurs the first bus 6 is in an idle state. The variable k is a positive integer and would normally be selected to be 1 or 2. When a cycle ends, a reset bit is set in the first slot to be issued thereafter from the HOB 18 onto the first bus 6. The header of each slot includes a reset bit. A slot transmitted on the first bus 6 with a set reset bit causes all of the remaining request counters 40 of the stations 4 to be reset so as to contain the predetermined allocation for each station 4.

A further period of time, cycle-min, may be monitored which indicates the minimum period of time a cycle may run for. Cycle-min, as for cycle-max may be set with respect to a particular number of slots issued by the HOB 18 or a particular number of slots received by the EOB 24. Thus, an end of cycle does not occur unless cycle-min has expired and this enables other stations to utilise unused capacity when one particular station has been monopolising the capacity. The provision of cycle-min can also be used to obtain control over the capacity available to the lower priority levels 0 and 1 when the request count monitored at the HOB 18 and the EOB 24 is only with respect to requests issued at priority levels 3 and 2. A similar effect is achieved by setting k to be greater than 1. Thus, once the stations 4 have utilised their priority level 2 request allocation, priority level 2 will not have priority over levels 1 and 0. This would be acceptable for variable rate video traffic accessing at priority level 2 as such traffic can drop slots in peak periods (depending on allowable jitter and buffering capabilities) and still obtain a required grade of service. By setting cycle-min equal to cycle-max, capacity is guaranteed for fixed rate video only. The setting of cycle-max is important to ensure an adequate sharing of capacity during the initial period of a cycle and prevent stations 4 closest to the HOB 18 or 20 corresponding to the bus on which transmission is desired from monopolising transmission on the desired bus at priority level 2.

To prevent certain stations 4 from gaining favourable access to slots available to satisfy priority level 2 or 3 requests, to the detriment of other stations 4, it is advantageous to have cycle-min alternate between two values cycle-min-busy and cycle-min-idle, where cycle-min-idle is generally greater than cycle-min-busy. Cycle-min is set to cycle-min-busy at the beginning of transmission and when the previous slot received by the EOB 24 includes a priority 2 or 3 request. Cycle-min is set to cycle-min-idle when the previous slot received by the EOB 24 does not include a priority 2 or 3 request. This prevents resets occurring too frequently. For example, if all the stations 4 have the same priority 2 request allocation, then cycle-min-busy could be set to one slot and cycle-min-idle could be set to at least the size of the allocation. Providing cycle-min-idle and cycle-min-busy prevents certain stations 4 from accumulating a large amount of priority level 2 request credit or, in other words, monopolising slots available to satisfy priority 2 or 3 requests.

Figure 6:
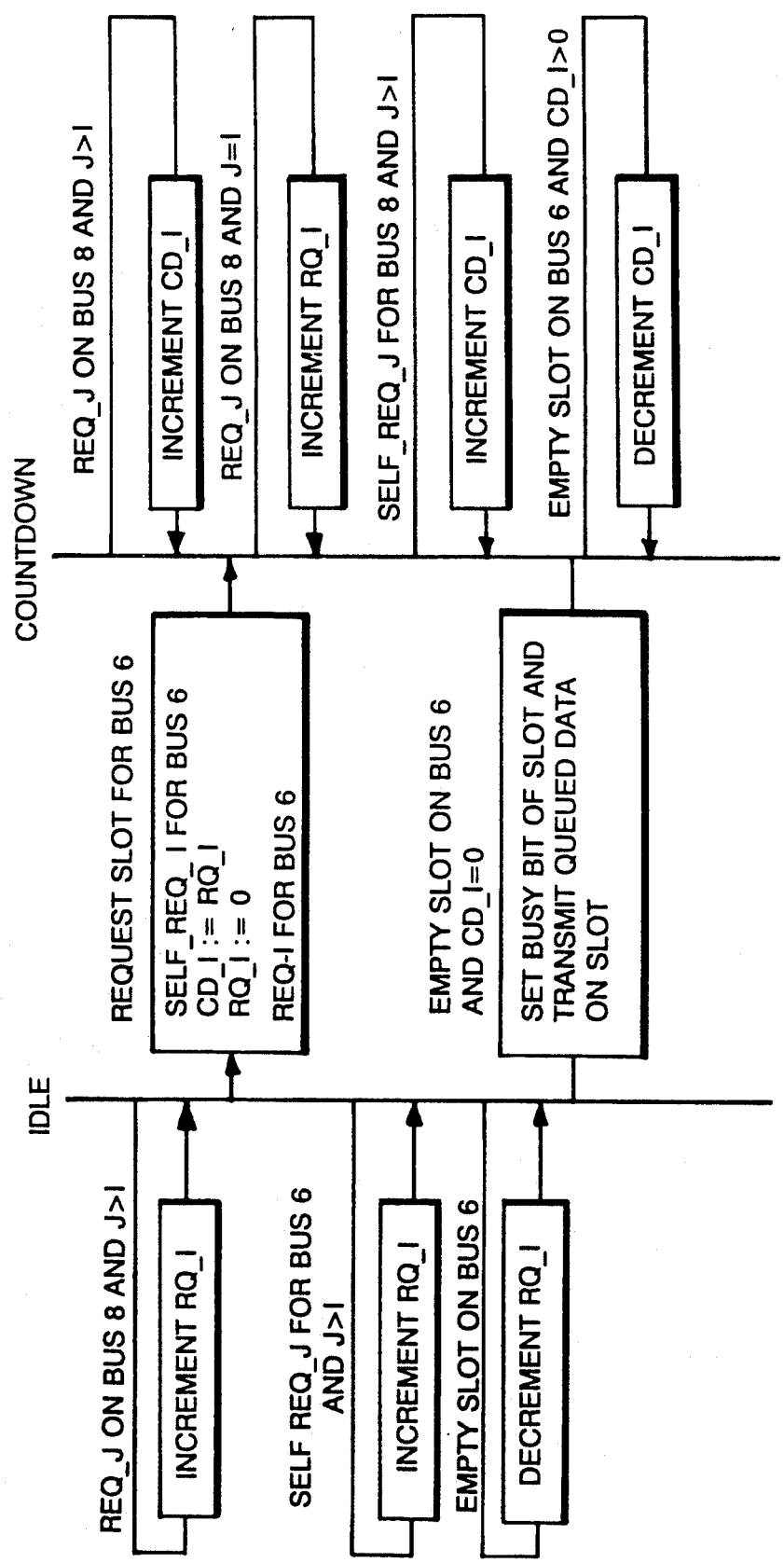
FIG. 6 is a flow diagram of a operating routine of the station for priority levels 3, 1 and 0.
Figure 7:
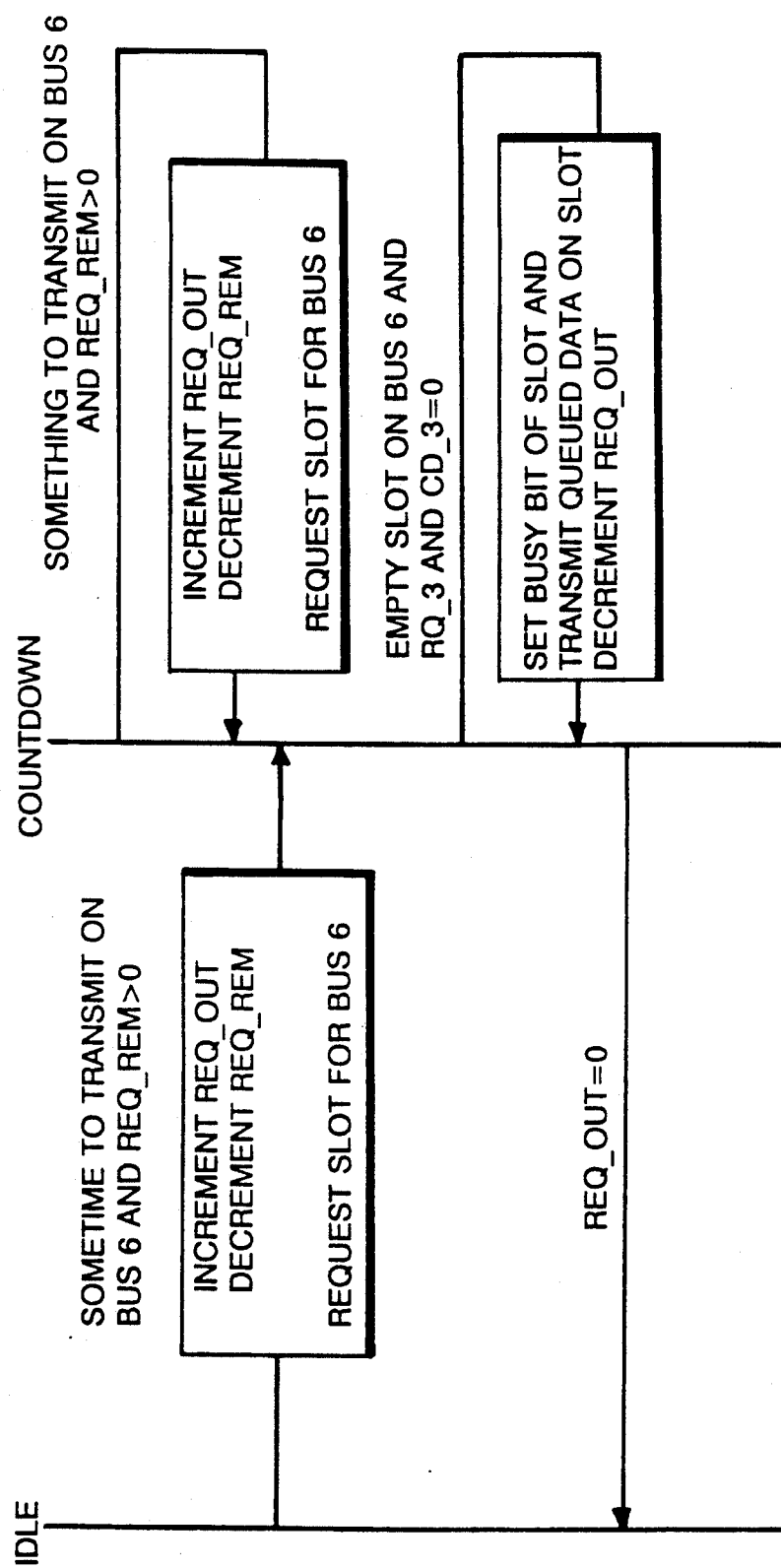
FIG. 7 is a flow diagram of an operating routine of the station for priority level 2, a guaranteed bandwidth priority level.

A first flow diagram illustrating operation of the stations 4 for maintaining a distributed queue with respect to bus 6 for priority level I, I=3, 1 and 0, is shown in FIG. 6. The stations 4 operate as state machines and are either in an idle state or countdown state for a bus 6 or 8. The letters J and I represent two priority levels, CD and RQ refer to the countdown and request counters, respectively, SELF REQ refers to a request issued by the respective station and REQ refers to a request signal placed on a bus 6 or 8. A second flow diagram illustrating operation of the stations 4, again with respect to bus 6, for the guaranteed bandwidth priority, priority level 2, is shown in FIG. 7, where REQ OUT and REQ REM refer to the request outstanding counters and request remaining counters, respectively.

The communications method described above has a number of attributes which are similar to those of a network protocol described in the specification of Australian Patent Application No. 44840/85 and known as Orwell. The Orwell protocol however is different in a number of respects and is primarily for use with ring structures. For the Orwell protocol stations are allocated a number of slots which can be used for transmission during a cycle instead of receiving a request allocation as for the communications method described above. This gives rise to a significant wastage of capacity because an idle state is only detected after an available slot has traversed the entire network without being utilised by any of the stations in the network for transmission. The network enters an idle state, and thus the end of a cycle, when all the stations have either exhausted their transmission allocation or do not need to transmit any data and, as mentioned, the only way to detect this condition is to transmit an available slot across the network. Therefore if the network is large, the delay which the stations must endure before their transmission allocation can be renewed may be a significant portion of the maximum cycle period.

For the preferred embodiment of the communications method of the present invention there is a small time shift between the beginning of a cycle for each station 4 as a reset bit is transmitted on the bus 6 or 8, which means that a request for a slot may issue in one cycle and may not be received at EOB 22 or 24 until the next cycle. Thus the request is satisfied in the next cycle. However, there is no wastage of capacity as for the Orwell protocol and any overlap from one cycle to the next is absorbed by the ability of the stations 4 to appropriately buffer data to transmitted until an available slot is received.

Stations which operate on the basis of the DQDB protocol, hereinafter referred to as DQDB stations, may be placed in a network which includes stations operating on the basis of the communications protocol of the present invention, hereinafter referred to as CYREC stations. The two types of stations can be combined in one network if the DQDB stations do not employ the priority level used by the CYREC stations to guarantee capacity, e.g. the DQDB stations do not employ priority 2. The HOBs 18 and 20 do not need to be CYREC stations, and can remain as DQDB stations which do not generate a cycle reset, as a cycle reset, which is generated by setting the reset bit of a slot, may be generated by the CYREC station closest to an HOB. The only difference between CYREC HOBs and DQDB HOBs, of course, is that the DQDB HOBs are not configured so as to provide a cycle reset signal.

The reliability features of the DQDB protocol can be maintained, to cater for events such as a break in the network, by making the CYREC stations which do not receive a cycle reset signal within a predetermined period of time generate a cycle reset signal, and every CYREC station generating a reset signal stop doing so when it receives a reset signal. Thus, if a station generating a reset signal becomes faulty, the next CYREC station takes over and generates a reset signal. Also, the CYREC station closest to a newly established HOB can now be used to generate a cycle reset signal upon network configuration. The process of network configuration is described in the IEEE 802.6 Committee Report referred to on page 1.

We claim:

1. A communications method for a shared-medium communications network having a plurality of stations connected in series by first and second buses, the first bus being for data transmission in one direction and the second bus being for data transmission in an opposite direction, said method comprising:

transmitting data between, to and from said stations on said buses in packets, or slots, of data during each of a plurality of cycles;

said stations requesting the use of a slot for data transmission by placing a request signal on the bus which transmits data in a direction opposite to the desired direction of transmission, each request signal being either a non-guaranteed bandwidth request for use of a slot on a first request, first use priority or a guaranteed bandwidth request for use of a slot without regard to first request, first use priority;

satisfying non-guaranteed bandwidth requests for use of a slot by said stations on a first request, first use priority;

satisfying guaranteed bandwidth requests for use of a slot by said stations without regard to first request, first use priority; and providing an allocation, for at least one of said stations, limiting the number of request signals for guaranteed bandwidth traffic which a station can issue during each cycle to obtain the use of slots without having regard to said first request, first use priority.

2. A communications method for a shared-medium communications network having a plurality of stations connected in series by first and second buses, the first bus being for data transmission in one direction and the second bus being for data transmission in an opposite direction, said method comprising:

transmitting data between, to and from said stations on said buses in packets, or slots, of data during each of a plurality of cycles;

said stations requesting the use of a slot for data transmission by placing a request signal on one of the buses, each request signal being either a non-guaranteed bandwidth request for use of a slot on a first request, first use priority or a guaranteed bandwidth request for use of a slot without regard to first request, first use priority;

satisfying non-guaranteed bandwidth requests for use of a slot by said stations on a first request, first use priority;

satisfying guaranteed bandwidth requests for use of a slot by said stations without regard to first request, first use priority; and providing an allocation, for at least one of said stations, limiting the number of request signals for guaranteed bandwidth traffic which a station can issue during each cycle to obtain the use of slots without having regard to said first request, first use priority.

3. A method as claimed in claim 1 or 2, further comprising establishing at least two priority levels on which requests can be made, whereby any one request signal corresponds to one of said priority levels, wherein request signals corresponding to a guaranteed priority level relate to requests made to obtain slots without regard to said first request, first use priority, and request signals corresponding to the remaining priority level or levels relate to requests which are satisfied according to said first request, first use priority with respect to the corresponding priority level, requests corresponding to a higher priority level being satisfied before requests corresponding to a lower priority level.

4. A method according to claim 3, wherein guaranteed priority level requests issued by a station are satisfied when a slot available for data transmission is received by the station, unless a higher priority level request is unsatisfied.

5. A method according to claim 4, maintaining a request remaining count for guaranteed priority level requests for each of said at least one of said stations, said count being decremented when a station issues a guaranteed priority level request and renewed at the end of a cycle so as to represent said allocation for said station.

6. A method according to claim 5, wherein said station is prevented from issuing a guaranteed priority level request when said count is below a predetermined level, which indicates said allocation has been exhausted.

7. A method according to claim 6, wherein the end of a cycle occurs after a first predetermined period of time or when the network enters an idle state, whichever occurs first.

8. A method according to claim 7, wherein the end of a cycle can only occur after a second predetermined period of time has expired from the beginning of the cycle.

9. A method according to claim 8, wherein the two buses are terminated by units which maintain counts of request signals received and issue available slots for data transmission, and the network enters an idle state when an available slot is issued on one of said buses and k consecutive slots, without request signals for the guaranteed priority level or higher, have been received by a terminating unit on the other bus, k being a positive integer.

10. A method according to claim 9, wherein said second predetermined period alternates between an idle value and a busy value, and is set to the busy value when the slot previously received by the terminating unit includes a request signal for the guaranteed priority level or higher and is set to the idle value when the slot previously received by the terminating unit is without a request signal for the guaranteed priority level or higher.

11. A method according to claim 10, wherein k is one.

12. A method according to claim 10, wherein the terminating units monitor said predetermined periods and issue a reset signal when said end of the cycle occurs, and network managing means determines said first predetermined period and said idle and busy values.

13. A station in a shared-medium communications network having a plurality of stations connected in series by first and second buses, the first bus being for data transmission in one direction and the second bus being for data transmission in an opposite direction, said station comprising means for receiving, processing and outputting packets, or slots, of data transmitted on said two buses during each of a plurality of cycles;

means for requesting the use of a slot for data transmission by placing a request signal on one of the busses, each request signal being either a non-guaranteed bandwidth request for use of a slot on a first request, first use priority or a guaranteed bandwidth request for use of a slot without regard to first request, first use priority;

means for satisfying non-guaranteed bandwidth requests for use of a slot on a first request, first use priority, comprising means for maintaining a request count which represents the number of request signals representing requests for use of slots on the basis of said first request, first use priority, said request count being decremented accordingly when an available slot is allowed by the station to pass on the other bus;

means for satisfying guaranteed bandwidth requests for use of a slot without regard to first request, first use priority, comprising means for maintaining a request outstanding count which represents the number of requests made by the station without regard to the first request, first use priority and which have not been satisfied; and means for providing an allocation limiting the number of request signals for guaranteed bandwidth traffic which the station can issue during each cycle to obtain the use of slots without having regard to said first request, first use priority, comprising means for maintaining a remaining request count which represents the number of requests which the station can make without regard to the first request, first use priority, said remaining request count being decremented when the station issues such a request.

14. A station according to claim 13, wherein said means for satisfying non-guaranteed bandwidth requests for use of a slot on a first request, first use priority further maintains a countdown count after said station has issued a request on said one bus for use of a slot on the basis of said first request, first use priority, said countdown count being equal to said request count when the request issues and being decremented, instead of said request count, when an available slot is allowed to pass by said station on the other bus, said station using the next available slot for data transmission when said countdown count reaches a predetermined value.

15. A station according to claim 14, wherein said counts are maintained with respect to at least two priority levels on which requests can be made, said request outstanding and said request remaining counts corresponding to a guaranteed priority level and respective said request and countdown counts corresponding to the remaining priority levels, said station being such that requests corresponding to a high priority level are satisfied before requests corresponding to a low priority level.

16. A station as claimed in claim 15, wherein guaranteed priority level requests issued by said station are satisfied when a slot available for data transmission is received by the station, unless a higher priority level request is unsatisfied.

17. A station as claimed in claim 16, wherein said request remaining count is renewed at the end of a cycle so as to represent said allocation.

18. A station as claimed in claim 17, wherein the station is unable to issue a guaranteed priority level request when said count is below a predetermined level, which indicates said allocation has been exhausted.

19. A station as claimed in claim 18, wherein the end of a cycle occurs after a first predetermined period of time or when the network enters an idle state, whichever occurs first.

20. A station as claimed in claim 19, wherein the end of a cycle can only occur after a second predetermined period of time has expired from the beginning of the cycle.

21. A shared-medium communications network having a plurality of stations connected in series by first and second buses, the first bus being for data transmission in one direction and the second bus being for data transmission in an opposite direction;

at least one of the stations comprising
means for receiving, processing and outputting packets, or slots, of data transmitted on said two buses during each of a plurality of cycles;
means for requesting the use of a slot for data transmission by placing a request signal on the bus which transmits data in a direction opposite to the desired direction of transmission, each request signal corresponding to one of a plurality of priority levels including a guaranteed priority level, requests corresponding to a high priority level being satisfied before requests corresponding to a low priority level, each request signal corresponding to the guaranteed priority level being a guaranteed bandwidth request for use of a slot without regard to first request, first use priority within the guaranteed priority level, each request signal corresponding to one of the other priority levels being a non-guaranteed bandwidth request for use of a slot on a first request, first use priority within the other priority level;
means for satisfying non-guaranteed bandwidth requests for use of a slot on a first request, first use priority;
means for satisfying guaranteed bandwidth requests for use of a slot without regard to first request, first use priority; and
means for providing an allocation limiting the number of request signals for guaranteed bandwidth traffic which the station can issue during each cycle to obtain the use of slots without having regard to said first request, first use priority; wherein
the two buses are terminated by units which maintain counts of request signals received and issue available slots for data transmission, and the network enters an idle state when an available slot is issued on one of said buses and k consecutive slots, without request signals for the guaranteed priority level or higher, have been received by a terminating unit on the other bus, k being a positive integer.

22. A network as claimed in claim 21, wherein
the end of a cycle occurs after a first, predetermined, maximum period of time or when the network enters an idle state, whichever occurs first, except that the end of the cycle can only occur after a second, predetermined, minimum period of time has expired from the beginning of the cycle; and
said second predetermined period alternates between an idle value and a busy value, and is set to the busy value when the slot previously received by the terminating unit includes a request signal for the guaranteed priority level or higher and is set to the idle value when the slot previously received by the terminating unit is without a request signal for the guaranteed priority level or higher.

23. A network as claimed in claim 22, wherein k is one.

24. A network as claimed in claim 22 or 23, wherein the terminating units monitor said predetermined periods and issue a reset signal when said end of the cycle occurs, and network managing means determines said first predetermined period and said idle and busy values.

25. A shared-medium communication network having a plurality of stations connected in series by first and second buses, the first bus being for data transmission in one direction and the second bus being for data transmission in an opposite direction, at least one of said stations comprising
means for receiving, processing and outputting packets, or slots, of data transmitted on said two buses during each of a plurality of cycles;
means for requesting the use of a slot for data transmission by placing a request signal on the bus which transmits data in a direction opposite to the desired direction of transmission, each request signal corresponding to one of a plurality of priority levels including a guaranteed priority level, requests corresponding to a high priority level being satisfied before requests corresponding to a low priority level, each request signal corresponding to the guaranteed priority level being a guaranteed bandwidth request for use of a slot without regard to first request, first use priority within the guaranteed priority level, each request signal corresponding to one of the other priority levels being a non-guaranteed bandwidth request for use of a slot on a first request, first use priority within the other priority level;
means for satisfying non-guaranteed bandwidth requests for use of a slot on a first request, first use priority;
means for satisfying guaranteed bandwidth requests for use of a slot without regard to first request, first use priority; and
means for providing an allocation limiting the number of request signals for guaranteed bandwidth traffic which the station can issue during each cycle to obtain the use of slots without having regard to said first request, first use priority;
the remaining stations satisfying requests only on the basis of said first request, first use priority and being unable to issue requests corresponding to said guaranteed priority level.

26. A network according to claim 25, wherein said at least one of said stations issues a reset signal to the remaining stations to signal the end of a cycle if a reset signal is not received by said at least one of said stations within a predetermined period of time.

* * * * *